United States Patent Office 3,099,167
Patented July 30, 1963

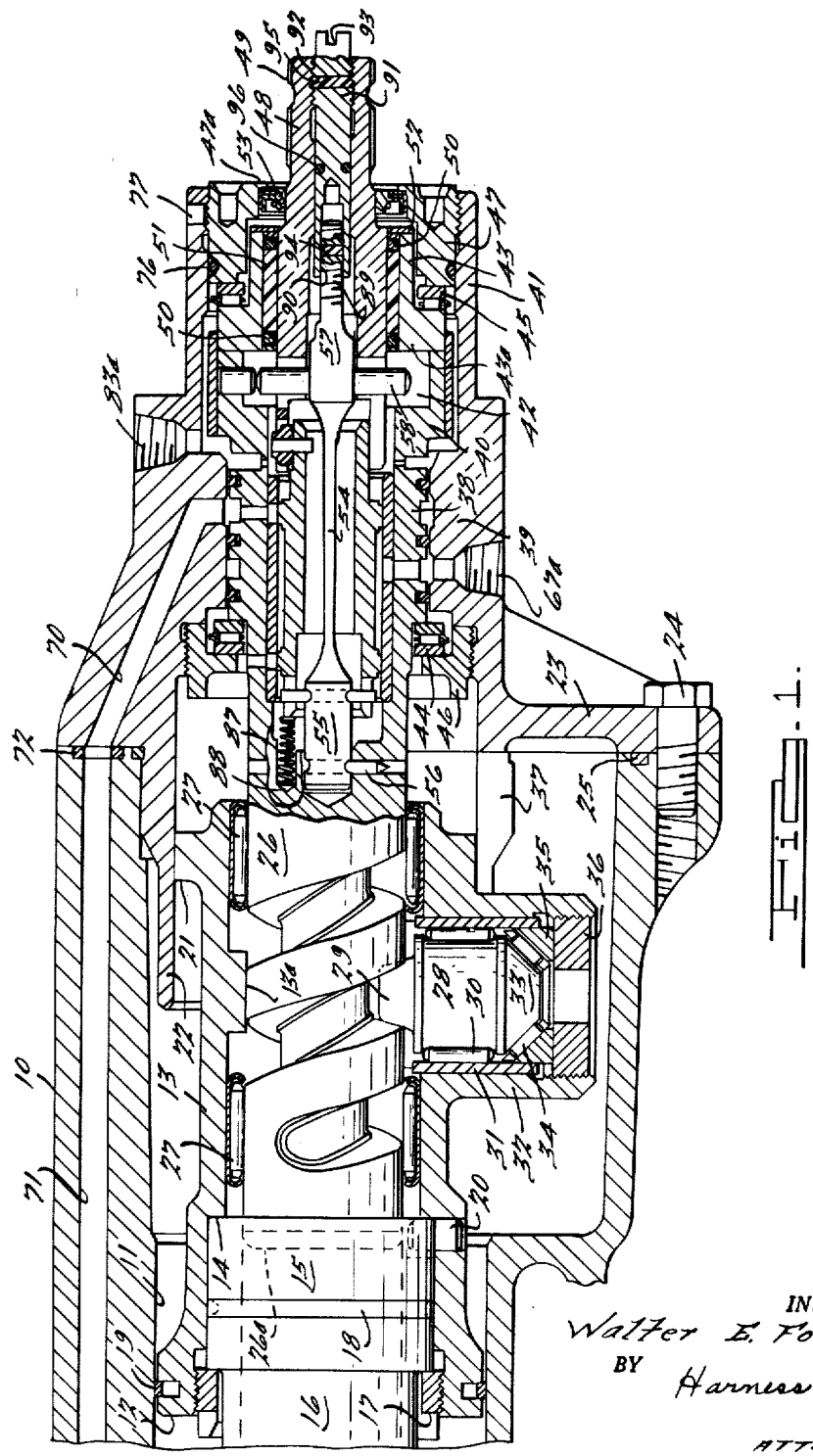

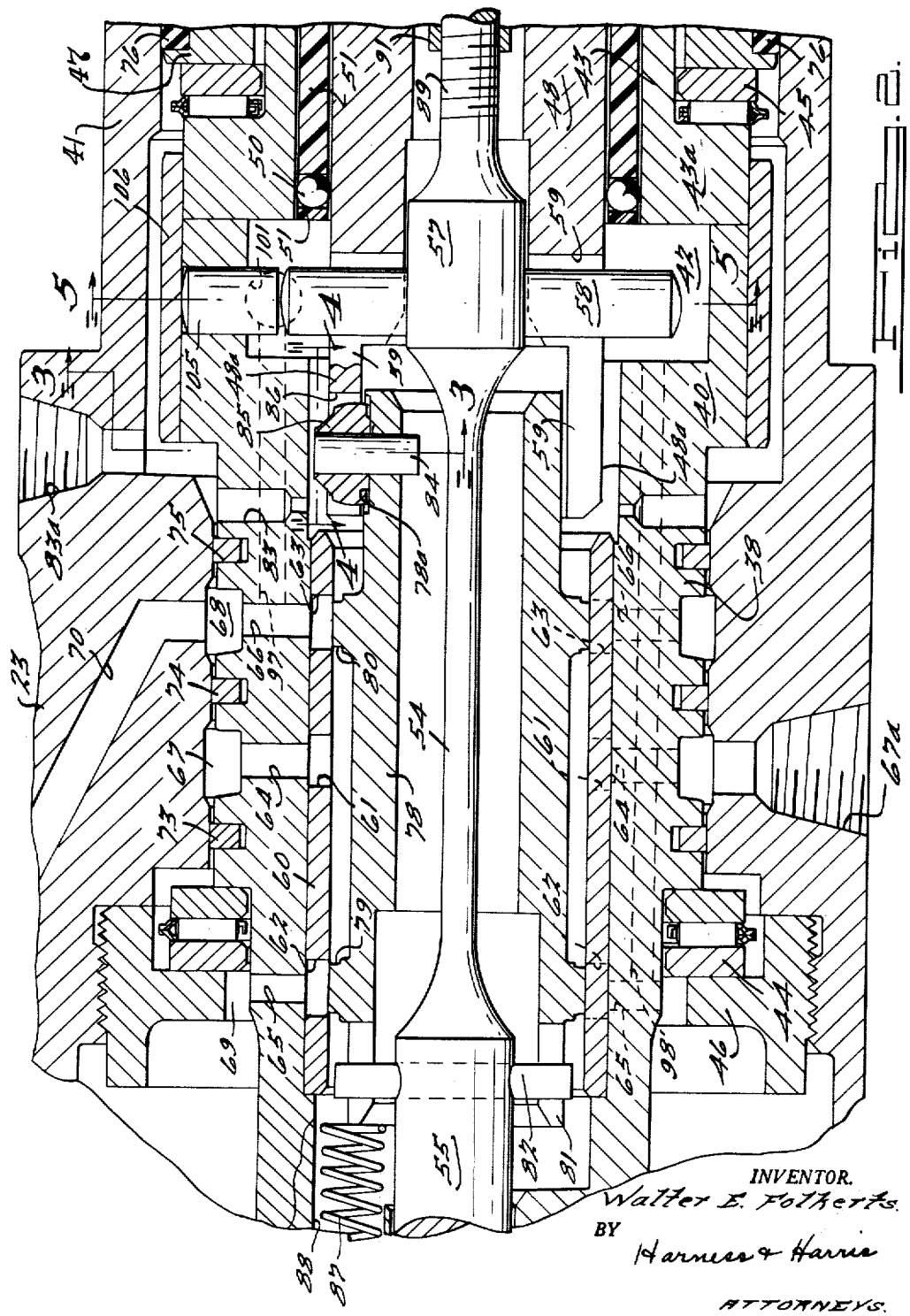

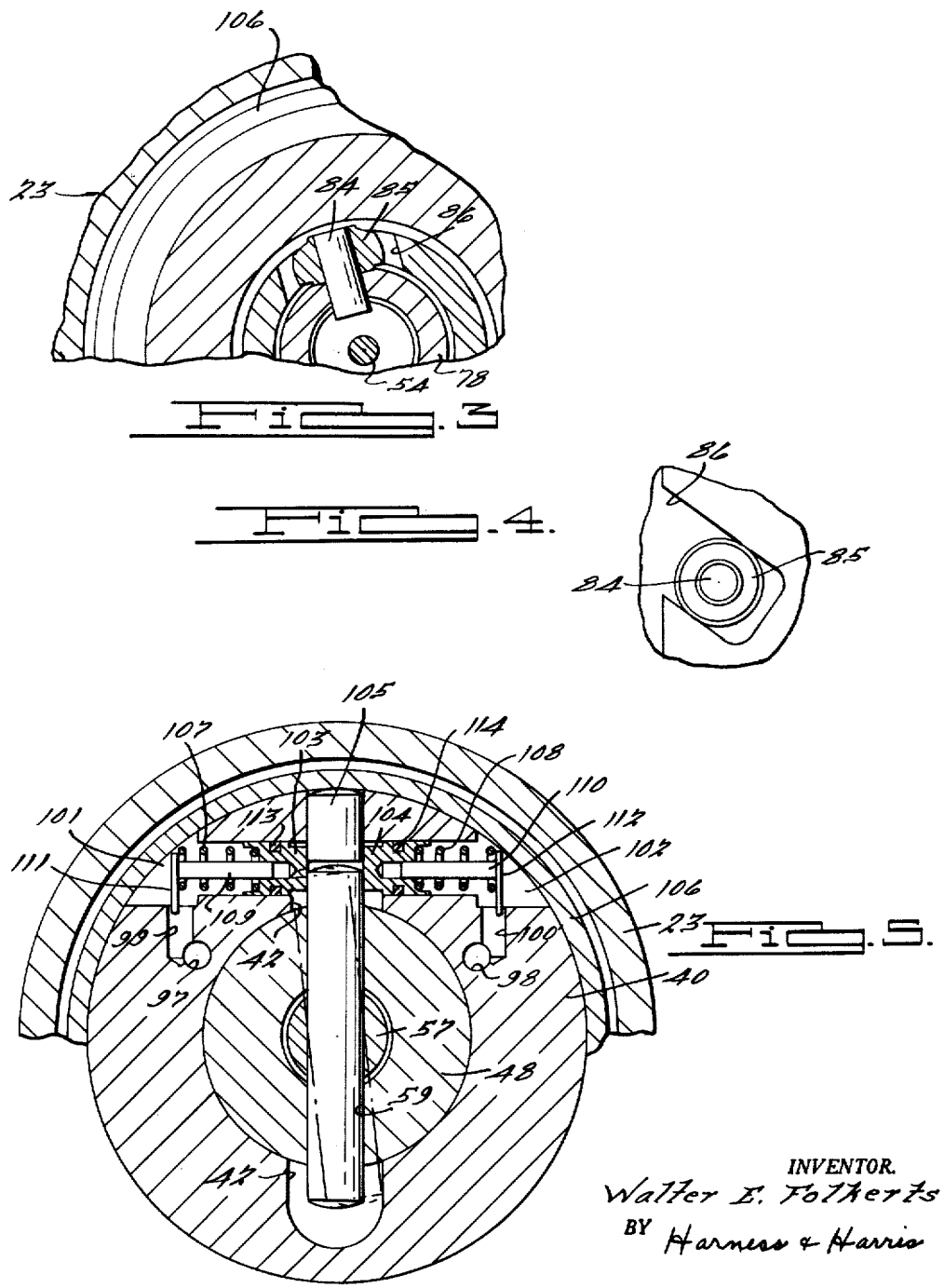

3,099,167
POWER STEERING GEAR
Walter E. Folkerts, Hazel Park, Mich., assignor to Chrysler Corporation, Highland Park, Mich., a corporation of Delaware
Filed June 23, 1960, Ser. No. 38,203
18 Claims. (Cl. 74—388)

This invention relates to power steering for automotive vehicles and to improvements over the structure disclosed in my copending application Serial No. 862,566, filed December 29, 1959, to which reference may be had for additional details of a steering gear adapted for use with the present invention.

In a variable ratio steering gear having a fluid actuated servo means of the follow-up type referred to in said copending application, a lost motion connection is provided between a personally rotatable steering shaft and a power driven rotatable shaft to enable limited relative rotational displacement therebetween, the latter shaft being operably connected with the dirigible wheels of the vehicle to turn the same. A torsion rod also interconnects the shafts to impart a resilient reaction force to the personally rotatable shaft upon relative rotation of the latter with respect to the power driven shaft. Connected to the power driven shaft to rotate therewith is an axially shiftable spool of a fluid control valve. Cooperating cam means are provided on the personally rotatable shaft and spool to shift the latter axially upon said relative rotation to control fluid power means for selectively rotating the power driven shaft to assist the steering movement.

An object of the present invention is to provide an improved compact steering gear of the above character which is particularly efficient in operation and economical in construction.

Another and more specific object is to provide a worm shaft having a coaxial tubular extension connected with a fluid actuated piston to be power actuated thereby. The extension contains a tubular slide valve or spool and a torsion rod arranged coaxially therein and keyed to the worm extension to rotate therewith, the torsion rod extending through the tubular spool and terminating in an enlarged end which extends coaxially into a tubular personally rotatable shaft. The latter is sleeved over an end of the spool and within the tubular extension of the worm shaft. A pin extending diametrically through the torsion rod and personally rotatable shaft keys these members together for rotation as a unit. The torsion rod imparts a resilient reaction to turning of the personally rotatable shaft relative to the worm shaft.

Another object is to provide such a structure wherein the diametrically extending pin projects radially into a lost motion slot in the tubular extension of the worm shaft, whereby limited relative turning of the manually rotatable shaft is enabled until the pin engages the tubular shaft extension. Thereafter, in the event that actuation of the valve spool fails to energize the piston and rotate the worm shaft to augment the manual steering movement, a direct manual driving engagement between the personally rotatable shaft and worm shaft is obtained.

Another object is to provide an improved compact steering gear wherein fluid reaction plungers in the side walls of the tubular worm shaft extension operatively engage opposite sides of an extension of said pin to resist its relative turning movement with a force proportional to the fluid power steering force, and wherein a pair of resilient reaction springs carried by the tubular worm shaft extension engage opposite sides of the pin to assist the torsion rod in resisting the relative rotation of the personally rotatable shaft.

Another object is to provide improved valve actuating means comprising a cam slot in the side wall of the personally rotatable tubular shaft, the latter being sleeved over an end of the valve spool. A roller cam follower mounted on the tubular valve spool to rotate about an axis extending radially to the axis of the spool rides in the cam groove to shift the spool axially upon the aforesaid relative turning of the personally rotatable shaft. By virtue of the foregoing, a particularly compact structure is obtained and an appreciably greater axial movement of the slide valve is enabled, for a given relative angular movement of the personally rotatable shaft, than is feasible with conventional valve actuating devices. In consequence, a greater overlap between the sealing parts of the valve spool and other cooperating parts of the valve system is achieved with a corresponding reduction in valve leakage.

Another object is to provide improved means for resiliently loading the valve spool so as to urge the latter yieldingly against one edge of the cam groove in the personally rotatable shaft, comprising a biasing spring seated against a portion of the worm shaft and an edge of the valve spool at the side thereof containing said roller cam follower, the spring being aligned in parallelism with the axis of the spool. Accordingly valve chatter and any tendency to cock the spool valve out of its desired axial alignment are minimized. Also by yieldingly urging the cam follower against one edge of the cam groove, the valve spool is rendered extremely sensitive to relative rotation of the personally rotatable shaft.

Another object is to balance the reaction force of the spool biasing spring by means of unbalanced reaction springs carried by the worm shaft.

Still other objects are to provide an improved and simplified valve spool and reaction assembly as above described wherein the end of the torsion rod which extends into one end of the tubular personally rotatable shaft is adjustably connected to the latter shaft to enable relative axial adjustment of the reference position of the latter shaft with respect to the torsion rod and accordingly with respect to the valve spool, the adjustable connection being accessible at the opposite end of the tubular personally rotatable shaft.

Other objects of this invention will appear in the following description and appended claims, reference being had to the accompanying drawings forming a part of this specification wherein like reference characters designate corresponding parts in the several views.

FIGURE 1 is a fragmentary longitudinal midsectional view through a steering mechanism embodying the present invention, showing the spool valve at the neutral or straight ahead steering position.

FIGURE 2 is a fragmentary enlarged view similar to FIGURE 1, showing details of the spool valve and torsion reaction mechanism.

FIGURE 3 is a fragmentary transverse section taken in the direction of the arrows substantially along the line 3—3 of FIGURE 2.

FIGURE 4 is a fragmentary sectional view taken in the direction of the arrows substantially along the line 4—4 of FIGURE 2.

FIGURE 5 is a fragmentary sectional view taken in the direction of the arrows substantially along the line 5—5 of FIGURE 2.

It is to be understood that the invention is not limited in its application to the details of construcion and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a variable ratio power steering mechanism is illustrated comprising a housing 10 suitably mounted in fixed relationship on a vehicle body and having a cylindrical portion 11 for an axially reciprocable piston 12. The latter is of tubular construction and has a rightward extension 13 of reduced inner diameter to provide a radial shoulder 14. Seated against the shoulder 14 is the enlarged head 15 of a tubular shaft 16 which extends leftward in FIGURE 1 and is operably connected with the dirigible wheels of the vehicle, as for example by means of a conventional gear rack integral with the shaft 16 meshed with a sector gear coupled with the dirigible mechanism. An annular nut 17 screwed into an internally threaded portion of the piston 12 solidly against the enlarged head 15 holds the latter against the shoulder 14 and secures the piston 12 and shaft 16 together for reciprocating actuation as a unit.

An annular seal 18 in sealing contact with the inner circumference of the piston extension 13 around the periphery of a head 15 in cooperation with an annular seal 19 in sealing contact with the inner surface of the cylinder 11 around the outer periphery of the piston 12 maintains a pressure differential across the piston 12 when such is applied by operation of the fluid control mechanism described below. A locating pin 20 extends radially through the wall of the extension 13 into the head 15 to prevent relative rotation between these two members.

The right end of extension 13 is provided with an integral annular enlargement 21 which rides axially in guided relation within a cylindrical sleeve 22 comprising a leftward extension of housing 23 secured to housing 10 by bolts 24. A sealing gasket 25 prevents fluid leakage at the juncture between the housings 10 and 23.

A worm shaft 26 journalled within extension 13 by means of a pair of annular needle bearings sets 27 projects coaxially into the bore of tubular shaft 16 and terminates at 26a. Rotation of worm 26 causes axial reciprocation of piston 12 by means of a conical worm follower 29 extending into and mating with the helical groove of the worm 26. The follower 29 extends coaxially from a cylindrical body 28 journalled by means of an annular set of needle bearings 30 within a cylindrical bushing 31 to rotate about an axis perpendicular to the axis of worm 26. The bushing 31 is fitted snugly within the bore of a cylindrical boss 32 of extension 13. The body 28 is provided with a conical outer end surface 33 rotatably supported by means of a conical thrust bearing set 34 and bushing 35, which in turn is retained in position by a nut 36 screwed into an internally threaded portion of boss 32. A slot 37 is provided in sleeve 22 to enable axial movement of boss 32 with extension 13. Diametrically opposed to the conical projection 29 is a cylindrical projection 13a of extension 13 which provides a reinforcement for the worm in opposition to the radial thrust of follower 29.

The worm shaft 26 extends to the right of its worm groove as an enlarged tubular extension 38 rotatably supported within a mating cylindrical portion 39 of housing 23. To the right of enlargement 38, the tubular extension of worm shaft 26 terminates in a second cylindrical enlargement 40 within a corresponding cylindrical extension 41 of housing 23. The enlargement 40 is provided with a circumferentially extending movement limiting slot 42, FIGURES 2 and 5, and terminates in abutment with the annular enlargement 43a of a tubular spacer 43. Left and right retainer bearings 44 and 45 are seated against the left end of enlargement 38 and the right edge of enlargement 43a respectively and are retained in position by annular retaining nuts 46 and 47 screwed into housing 23.

A tubular personally rotatable shaft 48 extends coaxially into the bore of the tubular shaft extension 40 and is provided with an axially extending spline 49 at its right end adapted for axial sliding connection with a manually rotatable steering shaft. The shaft 48 is journalled within spacer 43 by means of two sets of ball bearings 50 retained within a plastic cage 51 and suitably held in position by an annular retainer 52. An oil seal 53 retained in position around the shaft 48 by an annular flange 47a of nut 47 prevents axial leakage of fluid from housing extension 41 between nut 47 and shaft 48.

Referring in more particularity to FIGURE 2, a torsion rod 54 extends coaxially within the bore of shaft 26 and is provided with an enlarged left end 55 keyed to shaft 26 for rotation therewith by means of a diametrically extending pin 56, FIGURE 1. An enlarged right end 57 of rod 54 is keyed to shaft 48 to rotate therewith by means of a pin 58 which extends radially in opposite directions through diametrically opposed axially extending slots 59 in a leftward or inner extension 48a of tubular shaft 48. The slots 59 closely confine pin 58 to prevent relative rotational movement of shaft 48 with respect to the torsion rod enlargement 57, but enable axial adjusting movement of shaft 48 with respect to the rod 54.

Also extending coaxially with rod 54 and tightly pressed into the cylindrical bore of extension 38 is a window type valve sleeve 60 having a centrally disposed inlet port 61 spacing lateral working ports 62 and 63. The ports 61, 62, and 63 are formed similarly, each comprising a plurality of circumferentially extending windows extending around the major portion of the circumference of the sleeve 60. The port 61 communicates with at least one of a plurality of radially extending inlet ports 64 in the extension 38. Similarly the ports 62 and 63 communicate with radially extending working ports 65 and 66 in the extension 38.

Within the outer circumference of the extension 38 are annular grooves 67 and 68 in communication with the ports 64 and 66 respectively. Port 65 opens radially outwardly into an annular duct 69 comprising the space between the inner surface of nut 46 and the outer surface of shaft 26 and opening into the interior of housings 10 and 23 at the right side of piston 12. The annular groove 68 communicates with a conduit 70 in housing 23 which in turn communicates with conduit 71 leading to the interior of housing 10 at the left side of cylinder 12. An annular seal 72 around conduit 71 prevents fluid leakage from the latter conduit at the juncture between housings 10 and 23. Sealing rings 73 and 74 at opposite sides of groove 67, in cooperation with sealing ring 75 at the right side of groove 68 prevent undesired bypassing of the inlet fluid to the working conduits 69 and 70. An annular seal 76 around the periphery of nut 47 prevents axial loss of fluid between the latter and housing extension 41. A lock screw 77 screwed radially into extension 41 tightly against the outer periphery of nut 47 prevents loosening of the latter, FIGURE 1.

Reciprocable axially within sleeve 60 is a coaxial tubular valve spool 78 having annular lands 79 and 80 normally registering with the window ports 62 and 63 respectively and connecting the same with both the fluid inlet pressure of port 67 and with the fluid exhaust, as explained below, when the valve spool 78 is in the centered position illustrated. Lands 79 and 80 are guided by the portions of the sleeve 60 bridging the circumferentially extending slots of each of the window ports 62 and 63. The left end of spool 78 is provided with diametrically opposed axially extending slots 81 to enable axial movement of spool 78 with respect to a pin 82 extending diametrically through the torsion rod enlargement 55 and keying the latter and spool 78 together for rotation as a unit.

By virtue of the structure described, when the valve spool 78 is in the centered position shown, pressurized hydraulic fluid entering via inlet port 67a in housing 23 is conducted through inlet groove 67, ports 64 and 61, and thence around lands 79 and 80 to working ports 62, 65, and 63, 66. From port 62 the fluid is free to flow leftward around land 79, through slot 81 to the central bore of spool 78, and thence around the right end of the spool 78 to an exhaust port 83 in extension 38. Port 83 is in communication with the space between housing 23 and the worm shaft extensions 38 and 40, which space in turn is in communication with exhaust port 83a in housing 23. From port 63 the fluid is free to flow rightward around land 80 to exhaust port 83. Accordingly both sides of piston 12 will be subject to the same low exhaust back pressure that exists at port 83a.

Upon movement of spool valve 78 to the left, land 79 progressively opens port 62 to the fluid inlet pressure and progressively closes the latter port to the exhaust. Similarly land 80 progressively closes port 63 to the inlet pressure and opens the latter port to the exhaust pressure. Thus the right side of piston 12 will be progressively subjected to the inlet pressure and the left side will be exhausted to enable leftward movement of piston 12 with respect to housing 10. Upon leftward movement of piston 12, follower 29 riding in the spiral groove of worm shaft 26 rotates the latter shaft to give a power assist to leftward manual steering effort applied to shaft 48.

Upon rightward shifting of spool 78, port 62 will be progressively closed to the inlet pressure and opened to the exhaust, whereas port 63 will be progressively opened to the inlet pressure and closed to the exhaust. In consequence, the left end of piston 12 will be subject to the fluid inlet pressure and the right side of the piston will be open to exhaust, thereby to enable rightward shifting of piston 12 and a power steering assist in the opposite direction.

In order to actuate valve spool 78 in accordance with steering movement of shaft 48, the right end of spool 78 is provided with a flat seat 78a for a cylindrical roller 85 journalled on a pin 84 secured radially in the side wall of spool 78 at an angular position approximately 75° from the axis of pin 58. In this regard, the roller 85 and pin 84 are illustrated in FIGURES 1 and 2 approximately 75° out of phase so as to enable a reduction in the number of drawings. The extension 48a of the personally rotatable shaft 48 overlies the right end portion of spool 78 and extends coaxially into the right end of worm shaft extension 38. Opening obliquely endwise in extension 48a is a cam groove 86 which snugly contains the cam follower roller 85 so as to cause axial shifting of the latter and spool 78 upon relative rotational movement of shaft 48, FIGURE 4.

Extending parallel to the axis of spool 78 in axial alignment with the side of the latter containing the flat 78a and pin 84 is a coil spring 87 seated within a bore 88 in the worm shaft 26 and against the left end of spool 78 so as to urge the latter yieldingly to the right and maintain one edge of the cam slot 86 snugly against the roller 85 at all times. The axis of spring 87 intersects the axis of pin 84. A valve actuation is thus obtained which is extremely sensitive to rotation of shaft 48 and which avoids cocking of spool 78 within sleeve 60 as a result of the biasing force of spring 87.

Integral with the torsion rod enlargement 57 is a coaxial threaded extension 89 screwed into the internally threaded bore 90 of an adjusting element 91. The right end of the latter is provided with external threads 92 screwed into mating internal threads of shaft member 48 and terminates exteriorly of the latter shaft in a kerf 93, whereby member 91 is adjusted rotatably with a tool such as a screw driver. Suitable plastic friction pins 94 and 95 extend diametrically through the threaded portions 89 and 92 respectively to hold the associated members frictionally in their adjusted positions. An annular O-ring type seal 96 around the cylindrical adjustment member 91 and in fluid sealing contact with the interior of shaft 48 prevents axial endwise fluid leakage.

In the present instance, the threaded portion 89 is provided with a comparatively fine right hand screw thread having twenty-eight turns per inch. The portion 92 is provided with comparatively coarse right hand threads having twenty turns per inch. Accordingly, upon rotational adjustment of member 91, a micrometer adjustment of the relative axial positions of shaft 48 and cam groove 86 with respect to spool 78 and cam follower 85 is achieved. During such axial adjustment, slot 49 in extension 48a rides along pin 58.

In order to apply reaction to the manual steering torque on shaft 48 as a function of the torque required for the steering movement, right turn and left turn reaction ducts 97 and 98 respectively extending longitudinally in the sidewalls of the tubular extensions 38 and 40 connect the right turn and left turn working conduits 66 and 65 respectively with their respective right turn and left turn reaction chambers 101 and 102. The latter are formed tangentially in worm shaft extension 40 at opposite sides of one end of pin 58 and are connected with their respective ducts 97 and 98 by ducts 99 and 100 in extension 40, FIGURE 5. Fluid actuated plungers 103 and 104 reciprocable in the reaction chambers 101 and 102 respectively are urged toward pin 58 to resist rotational movement of the latter with respect to worm extension 40 from the centered position shown, the fluid reaction force being directly proportional to the fluid pressure in the working duct 66 or 65 as the case might be. A stop 105 secured within extension 40 coaxially with pin 50, when the latter is in its centered position, limits movement of the plungers 103 and 104 in directions toward the pin 58 and thus enable the exhaust back pressure in the conduit system to urge pin 58 to the centered position illustrated in FIGURE 5 when the slide valve 78 is at the centered or straight ahead steering position. An annular sleeve 106 extends closely around the extension 40 so as to enclose the assembly including the stop 105 and reaction chambers 101 and 102.

Inasmuch as both the fluid exhaust back pressure and the torsional reaction force of rod 54 are comparatively small when valve 78 is adjacent its centered position, the centering action of pin 58 is augmented by a pair of coil springs 107 and 108 around spring guides 109 and 110 within the reaction chambers 101 and 102 respectively. Spring 107 is seated under compression between plunger 103 and a retainer 111 integral with guide 109 and backed by sleeve 106. Similarly spring 108 is seated under compression between plunger 104 and a retainer 112 integral with guide 110 and backed by sleeve 106. Springs 107 and 108 thus serve to augment the fluid pressure acting on plungers 103 and 104 urging the same toward pin 58 to hold the latter in axial alignment with stop 105. Annular seals 113 and 114 around the plungers 103 and 104 respectively provide sealing engagement with the inner surfaces of the corresponding reaction cylinders 101 and 102 to prevent leakage of fluid pressure from the cylinders.

Inasmuch as leftward turning of shaft 48 with respect to worm 26 tends to shift spool 78 leftward in FIGURE 2 against the tension of spring 87, the left turn reaction spring 108 will exert a correspondingly smaller reaction force against pin 58 than spring 107, so that the resulting spring reaction force of springs 87 and 108 will equal the reaction force of spring 107.

I claim:

1. In a power steering gear for an automotive vehicle, a housing, an axially shiftable tubular shaft means adapted to be operably connected with the dirigible wheels of said vehicle to steer the same upon axial shifting of said shaft means, said shaft means having a fluid actuated piston portion for shifting the same, a worm rotatably journalled coaxially within said tubular shaft means, means operably connecting said shaft means and worm to turn the latter upon axial shifting of the former, said worm also having a tubular extension journalled in said housing, a torsion rod extending coaxially within said extension and having one end secured to said worm to rotate therewith, a personally rotatable shaft coaxial with said worm and secured to the other end of said torsion rod to rotate therewith, a lost motion connection between the latter shaft and said worm enabling limited relative rotational displacement therebetween, an axially shiftable tubular valve spool having said torsion rod extending coaxially therethrough, means connecting said spool with said worm for rotation therewith, cam means carried by said latter shaft and spool for shifting said spool axially upon rotation of said latter shaft, and means including portions carried by said spool for selectively directing fluid pressure to either side of said piston upon axial shifting of said spool.

2. In a power steering gear for an automotive vehicle, a housing, an axially shiftable tubular shaft means adapted to be operably connected with the dirigible wheels of said vehicle to steer the same upon axial shifting of said shaft means, said shaft means having a fluid actuated piston portion for shifting the same, a worm rotatably journalled coaxially within said tubular shaft means, means operably connecting said shaft means and worm to turn the latter upon axial shifting of the former, said worm also having a tubular extension journalled in said housing, a torsion rod extending coaxially within said extension and having one end secured to said worm to rotate therewith, a personally rotatable shaft coaxial with said worm and secured to the other end of said torsion rod to rotate therewith, a lost motion connection between the latter shaft and said worm enabling limited relative rotational displacement therebetween, an axially shiftable tubular valve spool having said torsion rod extending coaxially therethrough, means connecting said spool with said worm for rotation therewith, cam means carried by said latter shaft and spool for shifting said spool axially upon rotation of said latter shaft, means adjustably connecting the other end of said torsion rod and latter shaft for adjusting the reference position of said latter shaft with respect to said torsion rod, and means including portions carried by said spool for selectively directing fluid pressure to either side of said piston upon axial shifting of said spool.

3. In a power steering gear for an automotive vehicle, a housing, an axially shiftable tubular shaft means adapted to be operably connected with the dirigible wheels of said vehicle to steer the same upon axial shifting of said shaft means, said shaft means having a fluid actuated piston portion for shifting the same, a worm rotatably journalled coaxially within said tubular shaft means, means operably connecting said shaft means and worm to turn the latter upon axial shifting of the former, said worm also having a tubular extension journalled in said housing, a torsion rod extending coaxially within said extension and having one end secured to said worm to rotate therewith, a personally rotatable shaft coaxial with said worm and secured to the other end of said torsion rod to rotate therewith, a lost motion connection between the latter shaft and said worm enabling limited relative rotational displacement therebetween, an axially shiftable tubular valve spool having said torsion rod extending coaxially therethrough, means connecting said spool with said worm for rotation therewith; a cam groove in said latter shaft extending obliquely to the axis of the latter, a cam follower secured to said spool and extending radially therefrom into said groove for shifting said spool axially upon rotation of said latter shaft, and means including portions carried by said spool for selectively directing fluid pressure to either side of said piston upon axial shifting of said spool.

4. In a power steering gear for an automotive vehicle, a personally rotatable shaft, a power driven shaft, a lost motion connection between the two shafts enabling limited relative rotational displacement therebetween, torsion means connecting the two shafts, an axially shiftable valve spool connected with said power driven shaft to rotate therewith, cam means carried by said personally rotatable shaft and spool for shifting said spool axially upon rotation of the latter shaft, fluid actuated power means for driving said power driven shaft, and means including portions carried by said spool for selectively directing fluid power to said power means upon axial shifting of said spool.

5. In a power steering gear for an automotive vehicle, a personally rotatable shaft, a power driven shaft, a lost motion connection between the two shafts enabling limited relative rotational displacement therebetween, torsion means connecting the two shafts, an axially shiftable valve spool connected with said power driven shaft to rotate therewith, cam means carried by said personally rotatable shaft and spool for shifting said spool axially upon rotation of the latter shaft, means adjustably connecting said torsion means and said latter shaft for adjusting the reference position of the latter and the cam means carried thereby with respect to the cam means carried by said spool, fluid actuated power means for driving said power driven shaft, and means including portions carried by said spool for selectively directing fluid power to said power means upon axial shifting of said spool.

6. In a power steering gear for an automotive vehicle, a personally rotatable shaft, a power driven shaft, a lost motion connection between the two shafts enabling limited relative rotational displacement therebetween, torsion means connecting the two shafts, an axially shiftable valve spool connected with said power driven shaft to rotate therewith, a cam groove in said personally rotatable shaft extending obliquely to the latter's axis, a cam follower secured to said spool and extending radially therefrom into said groove for shifting said spool axially upon rotation of the latter shaft, fluid actuated power means for driving said power driven shaft, and means including portions carried by said spool for selectively directing fluid power to said power means upon axial shifting of said spool.

7. In a power steering gear for an automotive vehicle, a personally rotatable shaft, a power driven shaft, a lost motion connection between the two shafts enabling limited relative rotational displacement therebetween, torsion means connecting the two shafts, an axially shiftable valve spool connected with said power driven shaft to rotate therewith, a cam groove in said personally rotatable shaft extending obliquely to the latter's axis, a cam follower secured to said spool and extending radially therefrom into said groove for shifting said spool axially upon rotation of the latter shaft, means adjustably connecting said torsion means and said latter shaft for adjusting the reference position of the latter and the cam means carried thereby with respect to the cam means carried by said spool, fluid actuated power means for driving said power driven shaft, and means including portions carried by said spool for selectively directing fluid power to said power means upon axial shifting of said spool.

8. In a power steering gear for an automotive vehicle, a rotatable power driven shaft having a tubular end, a personally rotatable shaft, a lost motion connection between the two shafts enabling limited relative rotational displacement therebetween, an axially shiftable tubular valve spool arranged coaxially within said tubular end and secured to said driven shaft to rotate therewith, a torsion rod extending through said tubular spool and connected at one end with said driven shaft to rotate therewith, the other end of said rod being connected with said personally rotatable shaft to rotate therewith, a cam follower comprising a roller journalled on said spool to rotate about an axis extending radially with respect to the axis of said spool, means for shifting said spool axially upon relative rotation of said personally rotatable shaft comprising a cam groove in the latter shaft having said roller engaged therein, fluid actuated power means for driving said power driven shaft, and means including valve portions carried by said spool for selectively directing fluid power to said power means upon axial shifting of said spool.

9. In a power steering gear for an automotive vehicle, a rotatable power driven shaft having a tubular end, a personally rotatable shaft having a tubular end extending coaxially into the tubular end of said driven shaft, a lost motion connection between the two shafts enabling limited relative rotational displacement therebetween, an axially shiftable tubular valve spool arranged coaxially within the tubular end of said driven shaft and extending coaxially into the tubular end of said personally rotatable shaft, said spool being connected with said driven shaft, to rotate therewith, a torsion rod extending through said tubular spool and connected at one end with said driven shaft to rotate therewith, the other end of said rod extending into the tubular end of said personally rotatable shaft and being connected thereto to rotate therewith, a cam follower comprising a roller journalled on said spool to rotate about an axis extending radially with respect to the axis of said spool, means for shifting said spool axially upon relative rotation of said personally rotatable shaft comprising a cam groove in the tubular end of the latter shaft having said roller engaged therein, fluid actuated power means for driving said power driven shaft, and means including valve portions carried by said pool for selectively directing fluid power to said power means upon axial shifting of said spool.

10. In a power steering gear for an automotive vehicle, a rotatable power driven shaft having a tubular end, a personally rotatable shaft having a tubular end extending coaxially into the tubular end of said driven shaft, a lost motion connection between the two shafts enabling limited relative rotational displacement therebetween, an axially shiftable tubular valve spool arranged coaxially within the tubular end of said driven shaft and extending coaxially into the tubular end of said personally rotatable shaft, said spool being connected with said driven shaft to rotate therewith, a torsion rod extending through said tubular spool and connected at one end with said driven shaft to rotate therewith, the other end of said rod extending into the tubular end of said personally rotatable shaft and being connected thereto to rotate therewith, a cam follower comprising a roller journalled on said spool to rotate about an axis extending radially with respect to the axis of said spool, means for shifting and spool axially upon relative rotation of said personally rotatable shaft comprising a cam groove in the tubular end of the latter shaft having said roller engaged therein, spring means urging said roller axially of said spool in one direction against a side of said cam groove, fluid actuated power means for driving same power driven shaft, and means including valve portions carried by said spool for selectively directing fluid power to said power means upon axial shifting of said spool.

11. The combination according to claim 10 wherein said spring means is a coil spring seated within a bore extending in said driven shaft parallel to the axis of the latter shaft in alignment with said roller.

12. In a power steering gear for an automotive vehicle, a rotatable power drive shaft having a tubular end, a tubular personally rotatable shaft extending coaxially into the tubular end of said driven shaft, a lost motion connection between the two shafts enabling limited relative rotational displacement therebetween, an axially shiftable tubular valve spool arranged coaxially within the tubular end of said driven shaft and extending coaxially into one of said tubular shaft, said spool being connected with said driven shaft to rotate therewith, a torsion rod extending through said tubular spool and connected at one end with said driven shaft to rotate therewith, the other end of said rod extending axially slidably into said one end of said tubular shaft and being connected thereto to rotate therewith, a cam follower comprising a roller journalled on said spool to rotate about an axis extending radially with respect to the axis of said spool, means for shifting said spool axially upon relative rotation of said tubular shaft comprising a cam groove in the sidewall of the latter shaft having said roller engaged therein, means accessible at the other end of said tubular shaft and engaging the latter and said other end of said rod to adjust the relative axial reference position of said tubular shaft with respect to said rod, fluid actuated power means for driving said power drive shaft, and means including valve portions carried by said spool for selectively directing fluid power to said power means upon axial shifting of said spool.

13. The combination according to claim 12 including spring means yieldingly engaging said spool to urge said roller in one direction axially of said spool against one edge of said cam groove, said spring means engaging a side of said spool in axial alignment with said roller.

14. In a power steering gear for an automotive vehicle, a rotatable power driven shaft having a tubular end, a personally rotatable shaft extending coaxially into the tubular end of said driven shaft, an axially shiftable tubular valve spool arranged coaxially within said tubular end and secured to said driven shaft to rotate therewith, a torsion rod extending through said tubular spool and connected at one end with said driven shaft to rotate therewith, a cam follower comprising a roller journalled on said spool to rotate about an axis extending radially with respect to the axis of said spool, means for shifting said spool axially upon relative rotation of said personally rotatable shaft comprising a cam groove in the latter shaft having said roller engaged therein, means connecting the other end of said rod and personally rotatable shaft for rotation as a unit, said power driven shaft having a lost motion slot extending circumferentially therein, a projection rotatable with said personally rotatable shaft said projection extending radially from the latter shaft into said slot to enable limited relative rotational movement between the two shafts and to key said shafts together for rotation as a unit by engagement between said projection and power driven shaft at the circumferential ends of said slot, fluid actuated power means for driving said power driven shaft, and means including valve portions carried by said spool for selectively directing fluid power to said power means upon axial shifting of said spool.

15. The combination according to claim 14 including spring means yieldingly engaging said spool to urge said roller in one direction axially of said spool against one edge of said cam groove, and a pair of resilient reaction means carried by said power driven shaft to engage said projection for yieldingly opposing relative rotation between said two shafts in either direction respectively, the reaction means of said pair opposing relative rotation between said shafts in the direction tending to urge said spool axially in said one direction having a greater reaction force than the other reaction means of said pair.

16. In a power steering gear for an automotive vehicle, a rotatable power driven shaft having a tubular end, a personally rotatable shaft having a tubular end extending coaxially into the tubular end of said driven shaft, an axially shiftable tubular valve spool arranged coaxially within the tubular end of said driven shaft and extending coaxially into the tubular end of said personally rotatable shaft, said spool being connected with said driven shaft to rotate therewith, a torsion rod extending through said tubular spool and connected at one end with said driven shaft to rotate therewith, cam means carried by said personally rotatable shaft and spool for shifting the latter axially upon relative rotation of the latter shaft with respect to said spool, a pin extending diametrically through said latter shaft and the other end of said torsion rod to key the same together for rotation as a unit, said power driven shaft having a lost motion slot extending circumferentially therein, said pin extending radially into said slot to enable limited relative rotational movement between the two shafts and to key said shafts together for rotation as a unit by engagement between said pin and power driven shaft at the circumferential ends of said slot, reaction means carried by said power driven shaft to engage said pin in said slot for yieldingly opposing relative rotation between said two shafts, fluid actuated power means for driving said power driven shaft, and means including valve portions carried by said spool for selectively directing fluid power to said power means upon axial shifting of said spool.

17. In a power steering gear for an automotive vehicle, a rotatable power driven shaft having a tubular end, a tubular personally rotatable shaft extending coaxially into the tubular end of said driven shaft, an axially shiftable tubular valve spool arranged coaxially within the tubular end of said driven shaft and extending coaxially into one end of said tubular shaft, said spool being connected with said driven shaft to rotate therewith, a torsion rod extending through said tubular spool and connected at one end with said driven shaft to rotate therewith, cam means carried by said tubular shaft and spool for shifting the latter axially upon relative rotation of the latter shaft with respect to said spool, a pin extending diametrically through said latter shaft and the other end of said torsion rod to key the same together for rotation as a unit, said power driven shaft having a lost motion slot extending circumferentially therein, said pin extending radially into said slot to enable limited relative rotational movement between the two shafts and to key said shafts together for rotation as a unit by engagement between said pin and power driven shaft at the circumferential ends of said slot, reaction means carried by said power driven shaft to engage said pin in said slot for yieldingly opposing relative rotation between said two shafts, fluid actuated power means for driving said power driven shaft, and means including valve portions carried by said spool for selectively directing fluid power to said power means upon axial shifting of said spool.

18. In a power steering gear for an automotive vehicle, a rotatable power driven shaft having a tubular end, a tubular personally rotatable shift extending coaxially into the tubular end of said driven shaft, an axially shiftable tubular valve spool arranged coaxially within the tubular end of said driven shaft and extending coaxially into one end of said tubular shaft, said spool being connected with said driven shaft to rotate therewith, a torsion rod extending through said tubular spool and connected at one end with said driven shaft to rotate therewith, cam means carried by said tubular shaft and spool for shifting the latter axially upon relative rotation of the latter shaft with respect to said spool, a pin extending diametrically through said latter shaft and the other end of said torsion rod to key the same together for rotation as a unit, said power driven shaft having a lost motion slot extending circumferentially therein, said pin extending radially into said slot to enable limited relative rotational movement between the two shafts and to key said shafts together for rotation as a unit by engagement between said pin and power driven shaft at the circumferential ends of said slot, reaction means carried by said power driven shaft to engage said pin in said slot for yieldingly opposing relative rotation between said two shafts, means accessible at the other end of said tubular shaft and engaging the latter and said other end of said rod to adjust the relative axial reference position of said tubular shaft with respect to said rod, fluid actuated power means for driving said power driven shaft, and means including valve portions carried by said spool for selectively directing fluid power to said power means upon axial shifting of said spool.

No references cited.

UNITED STATES PATENT OFFICE
CERTIFICATE OF CORRECTION

Patent No. 3,099,167                                                          July 30, 1963

Walter E. Folkerts

It is hereby certified that error appears in the above numbered patent requiring correction and that the said Letters Patent should read as corrected below.

Column 2, line 65, for "construcion" read -- construction --; column 7, line 56, for "therewith;" read -- therewith, --; column 9, line 42, for "and" read -- said --; line 64, after "one" insert -- end --; column 10, line 32, after "shaft" insert a comma; column 12, line 3, for "shift" read -- shaft --.

Signed and sealed this 14th day of July 1964.

(SEAL)

Attest:

ESTON G. JOHNSON                                                     EDWARD J. BRENNER  
Attesting Officer                                                      Commissioner of Patents